(12) United States Patent
Yang et al.

(10) Patent No.: US 9,774,529 B2
(45) Date of Patent: Sep. 26, 2017

(54) METHOD AND APPARATUS FOR TRANSMITTING DATA FRAME

(71) Applicant: Huawei Technologies Co., Ltd., Shenzhen, Guangdong (CN)

(72) Inventors: Lvxi Yang, Nanjing (CN); Ziquan Zhou, Nanjing (CN); Shiyu Wang, Nanjing (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 222 days.

(21) Appl. No.: 14/309,450

(22) Filed: Jun. 19, 2014

(65) Prior Publication Data

US 2014/0307747 A1 Oct. 16, 2014

Related U.S. Application Data

(63) Continuation of application No. PCT/CN2012/086630, filed on Dec. 14, 2012.

(30) Foreign Application Priority Data

Dec. 20, 2011 (CN) .......................... 2011 1 0432226
Jan. 9, 2012 (CN) .......................... 2012 1 0004628
Mar. 2, 2012 (CN) .......................... 2012 1 0054871

(51) Int. Cl.
*H04L 12/741* (2013.01)
*H04L 29/06* (2006.01)
(Continued)

(52) U.S. Cl.
CPC .............. *H04L 45/74* (2013.01); *H04L 69/04* (2013.01); *H04L 69/22* (2013.01); *H04L 69/324* (2013.01);
(Continued)

(58) Field of Classification Search
CPC ..... H04L 29/08; H04L 69/04; H04L 61/6022; H04L 69/22; H04W 28/06; H04W 80/02
(Continued)

(56) References Cited

U.S. PATENT DOCUMENTS

| 7,912,489 | B2 | 3/2011 | Adachi et al. |
| 2007/0115977 | A1 | 5/2007 | Kevenaar et al. |
| 2009/0010199 | A1* | 1/2009 | Adachi ................. H04W 40/02 370/315 |

FOREIGN PATENT DOCUMENTS

| CN | 1778092 A | 5/2006 |
| CN | 101340379 A | 1/2009 |
| CN | 101854361 A | 10/2010 |

OTHER PUBLICATIONS

Abraham et al. "Improving MAC efficiency" "20110907r0 Qualcomm MAC efficiency", Sep. 7, 2011, Qualcomm, slides 1-8.*
(Continued)

*Primary Examiner* — Jung Park
(74) *Attorney, Agent, or Firm* — Leydig, Voit & Mayer, Ltd.

(57) ABSTRACT

The embodiments of the present invention provide a method and an apparatus for transmitting a data frame. The method comprises: acquiring at least one address of a destination address (DA) and a source address (SA), that are corresponding to data transmission direction information; determining, according to the data transmission direction information, an address field for carrying at least one address of the DA and the SA; and sending the data frame comprising the address field to a receiver. The method and apparatus for transmitting a data frame disclosed by the present invention can reduce overhead of an MAC frame header, improve transmission efficiency, and enable a station to acquire DA and/or SA of a data frame.

12 Claims, 5 Drawing Sheets

(51) Int. Cl.
 *H04W 28/06* (2009.01)
 *H04L 29/08* (2006.01)
 *H04L 29/12* (2006.01)
(52) U.S. Cl.
 CPC ......... *H04W 28/06* (2013.01); *H04L 61/6022* (2013.01)
(58) Field of Classification Search
 USPC ........................................................ 370/475
 See application file for complete search history.

(56) References Cited

OTHER PUBLICATIONS

Halasz, "Categories of TGah Use Cases and Straw Polls," IEEE 802.11-11/0301r2, Slides 1-53, Institute of Electrical and Electronics Engineers, New York, New York (Mar. 15, 2011).
Cheong, "TGah Functional Requirements and Evaluation Methodology Rev. 4," IEEE P8022.11 Wireless LANs, pp. 1-21, Institute of Electrical and Electronics Engineers, New York, New York (Sep. 2011).
Abraham et al., "Improving MAC efficiency," Extend Submission, 20110907r0 Qualcomm MAC efficiency, Slides 1-8 (Sep. 7, 2011).
Brenner, "A Technical Tutorial on the IEEE 802.11 Protocol," pp. 1-24, BreezeCOM Wireless Communications, Tel Aviv, Israel (Jul. 18, 1996).
Quan et al., "MAC Header Compression," IEEE 802.11-12/03 xxr1, Slides 1-9, Institute of Electrical and Electronics Engineers, New York, New York (Mar. 2012).

\* cited by examiner

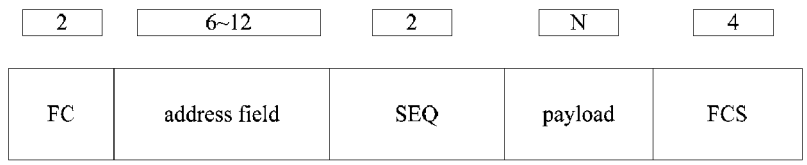
Fig. 3
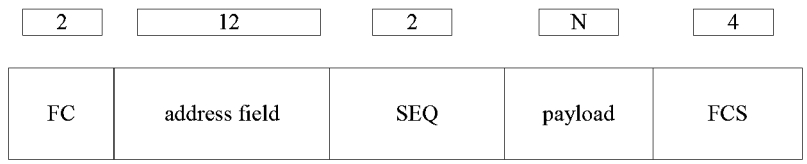
Fig. 4
200
determining a value of a forwarding identification bit (Forwarding) according to the data transmission direction information and to the DA or the SA — S141
sending the data frame including the ToDS, the FromDS, the address field, the FCS and the Forwarding to the receiver — S143
Fig. 5

300 receiving a data frame sent by a transmitter, wherein the data frame includes a to distributed system bit (ToDS), a from distributed system bit (FromDS), and an address field for carrying at least one address of a destination address (DA) and a source address (SA) of the data frame — S210 determining, according to the ToDS and the FromDs, data transmission direction information for indicating a station for transmitting the data frame — S220 determining, according to the data transmission direction information, address information carried by the address field to be at least one address of the DA and the SA — S230

Fig. 9

400 determining forwarding information according to a value of a forwarding identification bit (Forwarding) included in the data frame — S231 determining, according to the data transmission direction information and the forwarding information, the address information carried by the address field to be the DA and/or the SA — S233

Fig. 10

METHOD AND APPARATUS FOR TRANSMITTING DATA FRAME

CROSS-REFERENCE TO RELATED APPLICATIONS

This application is a continuation of International Patent Application No. PCT/CN2012/086630, filed on Dec. 14, 2012, which claims priority to Chinese Patent Application No. 201110432226.5, filed on Dec. 20, 2011, Chinese Patent Application No. 201210004628.X, filed on Jan. 9, 2012 and Chinese Patent Application No. 201210054871.2, filed on Mar. 2, 2012, all of which are hereby incorporated by reference in their entireties.

TECHNICAL FIELD

The embodiments of the present invention relate to communications, and more particularly, to a method and an apparatus for transmitting a data frame.

BACKGROUND

In some existing protocols, a data frame includes three parts, i.e. a media access control (MAC, Media Access Control) frame header, a frame body (Frame Body) and a 4-byte frame check sequence (FCS, Frame Check Sequence) domain, wherein the MAC frame header includes a 2-byte frame control (FC, Frame Control) field, a 2-byte duration/identifier (Duration/ID) field, an 18-byte address field and a 2-byte sequence control (Sequence Control). In this case, a fixed overhead of a data frame (an MAC frame header and an FCS domain) is as much as 28 bytes. However, a data packet in 802.11ah application scenario is generally quite short, e.g. a shortest data packet in a smartgrid is 25 bytes only. Thus, an MAC frame header has a relatively large overhead.

An existing method for compressing a data frame is to simplify a receiving address (RA) to an association identifier (AID) allocated to an STA by an AP, compute a complete RA address in an FCS field, and employ a partial transmitting address (PTX) to represent a transmitting address (TA).

However, a reception station may not necessarily be a destination station to be reached by a data frame, and a transmission station may not necessarily be a source transmission station of the data frame. In presence of data frame forwarding, transmission cannot be completed in the prior art.

Therefore, it is necessary to provide a method and an apparatus for transmitting a data frame, so as to reduce overhead of a frame header, improve transmission efficiency, and complete transmission in presence of data frame forwarding.

SUMMARY

The embodiments of the present invention provide a method and an apparatus for transmitting a data frame, which can reduce overhead of an MAC frame header, improve transmission efficiency, and enable a station to acquire DA and/or SA of a data frame.

In one aspect, a method for transmitting a data frame is provided, including:

acquiring at least one address of a destination address (DA) and a source address (SA), that are corresponding to data transmission direction information;

determining, according to the data transmission direction information, an address field for carrying at least one address of the DA and the SA; and sending the data frame comprising the address field to a receiver.

In addition, the method further includes: determining, according to data transmission direction information for indicating a station for transmitting the data frame, a value of a to distributed system bit (ToDS) and a value of a from distributed system bit (FromDS); wherein the data frame comprising the address field that is sent to the receiver further comprises the ToDS and the FromDS.

In another aspect, a method for transmitting a data frame is provided, including: receiving a data frame sent by a transmitter, wherein the data frame comprises data transmission direction information and an address field for carrying at least one address of a destination address (DA) and a source address (SA) of the data frame; and determining, according to the data transmission direction information, address information carried by the address field to be at least one address of the DA and the SA.

Further, the data frame comprises a to distributed system bit (ToDS) and a from distributed system bit (FromDS), the data transmission direction information is determined according to the ToDS and the FromDS, and the data transmission direction information is data transmission direction information for indicating a station for transmitting the data frame.

In another aspect, an apparatus for transmitting a data frame is provided, including: an address acquiring unit, configured to acquire at least one address of a destination address (DA) and a source address (SA), that are corresponding to data transmission direction information;

an address field determining unit, configured to determine, according to the data transmission direction information, an address field for carrying at least one address of the DA and the SA acquired by the address acquiring unit; and a sending unit, configured to send the data frame comprising the address field to a receiver.

In addition, the apparatus further includes:

a distributed system (DS) bit determining unit, configured to determine, according to data transmission direction information for indicating a station for transmitting the data frame, a value of a to distributed system bit (ToDS) and a value of a from distributed system bit (FromDS);

wherein the data frame comprising the address field that is sent to the receiver further comprises the ToDS and the FromDS.

In another aspect, an apparatus for transmitting a data frame is provided, including: a receiver, configured to receive a data frame sent by a transmitter, wherein the data frame comprises an address field for carrying at least one address of a destination address (DA) and a source address (SA) of the data frame; and an address determining unit, configured to determine, according to data transmission direction information, address information carried by the address field to be at least one address of the DA and the SA.

The data frame comprises a to distributed system bit (ToDS) and a from distributed system bit (FromDS), and the apparatus further comprises:

a data transmission direction information determining unit, configured to determine, according to the ToDS and the FromDs, data transmission direction information for indicating a station for transmitting the data frame.

Based on the above technical solution, according to the method and the apparatus for transmitting a data frame provided by the embodiments of the present invention, it is determined, via data transmission direction information for determining a station for transmitting a data frame, that an address field carries DA and/or SA of the data frame, such that an address field includes 12 bytes at most, thereby reducing overhead of an MAC frame header, improving transmission efficiency, and completing transmission in presence of data frame forwarding.

BRIEF DESCRIPTION OF DRAWINGS

FIG. 3 is a schematic diagram of a structure of an exemplary MAC frame header generated by a transmitter according to an embodiment of the present invention.

FIG. 4 is a schematic diagram of a structure of another exemplary MAC frame header generated by a transmitter according to an embodiment of the present invention.

FIG. 5 is a schematic flow of a method for transmitting a data frame according to another embodiment of the present invention.

FIG. 9 is a schematic flow of a method for transmitting a data frame according to another embodiment of the present invention.

FIG. 10 is a schematic flow of a method for transmitting a data frame according to still another embodiment of the present invention.

DESCRIPTION OF EMBODIMENTS

The technical solution in the embodiments of the present invention will be described clearly and fully hereinafter in conjunction with the drawings in the embodiments of the present invention. Apparently, the embodiments described are only a part, but not all, of the embodiments of the present invention. All other embodiments, which can be derived by the persons of ordinary skills in the art based on the embodiments of the present invention without any inventive efforts, fall into the protection scope of the present invention.

The technical solution of the present invention may be applied to a variety of communication systems, such as a GSM, a code division multiple access (CDMA) system, wideband code division multiple access wireless (WCDMA), general packet radio service (GPRS), long term evolution (LTE) and the like.

In an embodiment of the present invention, a subject for transmitting a data frame may includes a transmitter and a receiver, and in the following descriptions, a transmitter and a receiver are illustrated by taking a subscriber station STA or an access point AP as an example. It should be understood that a transmitter and a receiver in an embodiment of the present invention are not limited to an STA or an AP, and may also include other terminal device. Furthermore, an STA may represent a terminal device, and serve as a source station or a destination station of a data frame; and an AP may represent a forwarding device and forward a data frame.

Figure 1:
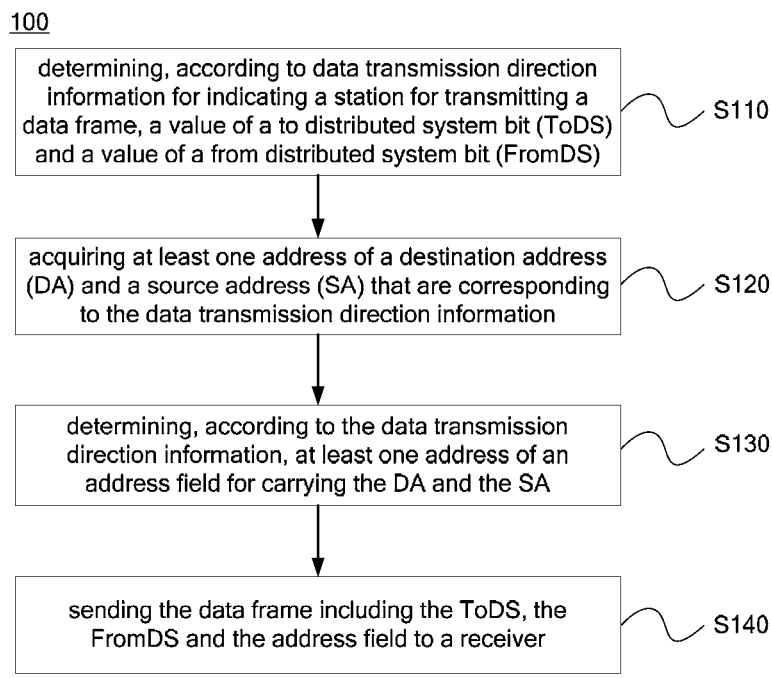
FIG. 1 is a schematic flow of a method for transmitting a data frame according to an embodiment of the present invention.

FIG. 1 illustrates a schematic flow of a method for transmitting a data frame 100 according to an embodiment of the present invention, which is expressed in terms of a transmitter. As shown in FIG. 1, the method 100 includes the following steps:

S110, determining, according to data transmission direction information for indicating a station for transmitting a data frame, a value of a to distributed system bit (ToDS) and a value of a from distributed system bit (FromDS);

S120, acquiring at least one address of a destination address (DA) and a source address (SA) that are corresponding to the data transmission direction information;

S130, determining, according to the data transmission direction information, an address field for carrying at least one address of the DA and the SA; and S140, sending the data frame including the ToDS, the FromDS and the address field to a receiver.

In the embodiment of the present invention, a receiving address (RA) may optionally be acquired in S120; and the method for transmitting the data frame 100 according to the embodiment of the present invention may further include a step of: determining a frame check sequence (FCS) of the data frame according to a frame header, a frame body and a receiving address (RA) of the data frame. In this case, the data frame including the ToDS, the FromDS, the address field and the FCS is sent to the receiver in S140.

Specifically, in the embodiment of the present invention, a subject for transmitting the data frame, i.e. the transmitter and the receiver, may be either an STA or an AP. Consequently, in S110, the transmitter may firstly determine types of the transmitter and the receiver, and then determine values of the ToDS and the FromDS in the FC according to the data transmission direction information for determining if a transmission station is an STA or an AP and if a reception station is an STA or an AP, so that the receiver can determine the data transmission direction information according to the values of the ToDS and the FromDS. Detailed description will be made hereinafter to a specific scheme for determining the values of the ToDS and the FromDS.

If the receiver of the data frame is an STA and the transmitter of the data frame is an STA, the value of the ToDS may be set to 0 and the value of the FromDS may be set to 0;

if the receiver of the data frame is an AP and the transmitter of the data frame is an STA, the value of the ToDS may be set to 1 and the value of the FromDS may be set to 0; and if the receiver of the data frame is an STA and the transmitter of the data frame is an AP, the value of the ToDS may be set to 0 and the value of the FromDS may be set to 1.

In the aforementioned embodiment, a scheme is introduced by taking a ToDS and a FromDS as an example, however, employing the ToDS and the FromDS is merely a specific method for indicating a data transmission direction, and it may be implemented with any other indication manner from which a data transmission direction can be determined. For example, an uplink indication field and a downlink indication field are directly set, wherein uplink refers to sending from an STA to an AP, while downlink refers to sending from an AP to an STA, and so on.

As a result, it should be understood that, in the method of the embodiment of the present invention, data transmission direction information for indicating a data frame transmission station may be acquired at first, and then at least one address of a destination address (DA) and a source address (SA) corresponding to the data transmission direction information is determined. The method may be implemented with either ToDS and FromDS or other manner.

A method for transmitting a data frame in a new embodiment includes the following steps:

acquiring at least one address of a destination address (DA) and a source address (SA) that are corresponding to data transmission direction information;

determining, according to the data transmission direction information, an address field for carrying at least one address of the DA and the SA; and sending the data frame including the address field to a receiver.

It should be understood that it is merely one embodiment of the present invention to set the ToDS and FromDS to the above specific values, and any other values from which whether the transmitter and the receiver are an STA or an AP can be determined shall fall into the protection scope of the present invention. For example, if the receiver of the data frame is an STA and the transmitter of the data frame is an STA, the value of the ToDS may be set to 1 and the value of the FromDS may be set to 1;

if the receiver of the data frame is an AP and the transmitter of the data frame is an STA, the value of the ToDS may be set to 0 and the value of the FromDS may be set to 1; and if the receiver of the data frame is an STA and the transmitter of the data frame is an AP, the value of the ToDS may be set to 1 and the value of the FromDS may be set to 0. Description of an identical or a similar situation will be omitted hereinafter.

When establishing a communication link, a transmitter and a receiver may learn an MAC address of one another through a beacon (Beacon) frame, an authentication frame, an association frame and/or the like. Further, MAC addresses of a destination station and a source station may be determined according to a user terminal and a server terminal of service. Consequently, in S120, the transmitter is capable of acquiring a transmitting address (TA), a receiving address (RA), a destination address (DA) and a source address (SA); and additionally, at least one address of the destination address (DA) and the source address (SA) that are corresponding to data transmission direction information may further be acquired according to the data transmission direction information, i.e. acquiring the DA and/or the SA corresponding to the data transmission direction information. For example, if the receiver of the data frame is an STA and the transmitter of the data frame is an STA, then the TA is same as the SA and the RA is same as the DA, and the transmitter may just acquire the SA which may be represented by an association identifier (AID) of the transmitter in a BSS for data frame transmission and a BSSID of the BSS;

if the receiver of the data frame is an AP and the transmitter of the data frame is an STA, then the TA is same as the SA, and the transmitter may just acquire the SA, the DA and a BSSID of the AP, and the SA may be represented by an AID allocated to the transmitter by the AP; and if the receiver of the data frame is an STA and the transmitter of the data frame is an AP, then the RA is same as the DA, and the transmitter may just acquire the SA and a BSSID of the AP.

As a result, in the method for transmitting a data frame according to the embodiment of the present invention, number of addresses to be acquired can be reduced and an amount of time spent in requiring the addresses can be shortened, thereby improving transmission efficiency.

In S130, the transmitter may firstly determine types of the transmitter and the receiver, determine an address to be sent to the receiver from the address acquired in S120 according to whether the transmission station is an STA or an AP and whether the reception station is an STA or an AP, and carry the address in an address field of an MAC frame header. In the embodiment of the present invention, the address field follows after an FC field and starts from the third byte of the MAC frame header, and additionally, the address field may be set, according to a predetermined protocol, to occupy different numbers of bytes under different situations, e.g. 2, 6, 8 or 12. It should be understood that, in the foregoing descriptions, a position of the address field and the number of bytes occupied by the address field in the MAC frame header merely constitute one embodiment of the present invention, rather than limiting the present invention. Setting of the address field will be described in detail hereinafter.

Figure 2:
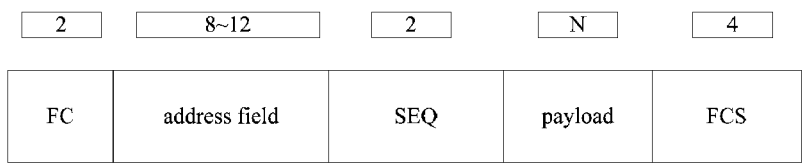
FIG. 2 is a schematic diagram of a structure of an MAC frame header generated by a method for transmitting a data frame according to an embodiment of the present invention.

As shown in FIG. 2 and Table 1, if the receiver of the data frame is an STA and the transmitter of the data frame is an STA, i.e. ToDS=0 and FromDS=0, it may be determined that the transmitter of the data frame is a source station of the frame and the receiver is a destination station of the frame, and consequently, the address field may be used for carrying only the SA of the data frame, and the SA may represent as an AID (2 bytes) of the transmitter in a BSS for data frame transmission and a BSSID (6 bytes) of the BSS;

if the receiver of the data frame is an AP and the transmitter of the data frame is an STA, i.e. ToDS=1 and FromDS=0, the AP may need to forward the data frame, and consequently, the address field may be used for carrying only an AID (2 bytes) of the transmitter in the BSS for data frame transmission and the DA (6 bytes) of the data frame; and if the receiver of the data frame is an STA and the transmitter of the data frame is an AP, i.e. ToDS=0 and FromDS=1, the data frame may be forwarded from the AP, and consequently, the address field may be used for carrying only a BSSID (6 bytes) of a BSS of the AP and the SA (6 bytes) of the data frame.

TABLE 1

| ToDS | FromDS | Address Field | | Description |
|---|---|---|---|---|
| 0 | 0 | TA = AID(2) | BSSID(6) | Sending from STA to STA |
| 1 | 0 | TA = AID(2) | DA(6) | Sending from STA to AP |
| 0 | 1 | TA = BSSID(6) | SA(6) | Sending from AP to STA |

As a result, as shown in Table 2, in the case that the receiver of the data frame is an STA and the transmitter of the data frame is an STA, the MAC frame header has 16 bytes in total, and thus 12 bytes are reduced compared with the prior art;

in the case that the receiver of the data frame is an AP and the transmitter of the data frame is an STA, the MAC frame header has 16 bytes in total, and thus 12 bytes are reduced compared with the prior art; and in the case that the receiver of the data frame is an STA and the transmitter of the data frame is an AP, the MAC frame header has 20 bytes in total, and thus 8 bytes are reduced compared with the prior art.

TABLE 2

| ToDS | FromDS | Improved MAC Header | Bytes Reduced |
|------|--------|---------------------|---------------|
| 0 | 0 | 16 Bytes | 12 Bytes |
| 1 | 0 | 16 Bytes | 12 Bytes |
| 0 | 1 | 20 Bytes | 8 Bytes |

The method for transmitting the data frame in the embodiment of the present invention enables that at most 12 bytes are included in the address field, which can reduce overhead of the MAC frame header, improve transmission efficiency, and complete transmission in the presence of data frame forwarding.

Optionally, as shown in FIG. 3 and Table 3, if the receiver of the data frame is an STA and the transmitter of the data frame is an STA, i.e. ToDS=0 and FromDS=0, it may be determined that the transmitter of the data frame is the source station of the frame and the receiver is the destination station of the frame, and consequently, the address field may be used for carrying only the SA (6 bytes) of the data frame;

if the receiver of the data frame is an AP and the transmitter of the data frame is an STA, i.e. ToDS=1 and FromDS=0, the AP may need to forward the data frame, and consequently, the address field may be used for carrying only the SA (6 bytes) of the data frame and the DA (6 bytes) of the data frame; and if the receiver of the data frame is an STA and the transmitter of the data frame is an AP, i.e. ToDS=0 and FromDS=1, the data frame may be forwarded from the AP, and consequently, the address field may be used for carrying only the BSSID (6 bytes) of the BSS of the AP and the SA (6 bytes) of the data frame.

TABLE 3

| ToDS | FromDS | Address Field | | Description |
|------|--------|--------------|--|-------------|
| 0 | 0 | TA = SA(6) | Null | Sending from STA to STA |
| 1 | 0 | TA = SA(6) | DA(6) | Sending from STA to AP |
| 0 | 1 | TA = BSSID(6) | SA(6) | Sending from AP to STA |

As a result, as shown in Table 4, in the case that the receiver of the data frame is an STA and the transmitter of the data frame is an STA, the MAC frame header has 16 bytes in total, and thus 14 bytes are reduced compared with the prior art;

in the case that the receiver of the data frame is an AP and the transmitter of the data frame is an STA, the MAC frame header has 20 bytes in total, and thus 8 bytes are reduced compared with the prior art; and in the case that the receiver of the data frame is an STA and the transmitter of the data frame is an AP, the MAC frame header has 20 bytes in total, and thus 8 bytes are reduced compared with the prior art.

TABLE 4

| ToDS | FromDS | Improved MAC Header | Bytes Reduced |
|------|--------|---------------------|---------------|
| 0 | 0 | 14 Bytes | 14 Bytes |
| 1 | 0 | 20 Bytes | 8 Bytes |
| 0 | 1 | 20 Bytes | 8 Bytes |

As a result, the method for transmitting the data frame in the embodiment of the present invention enables that at most 12 bytes are included in the address field, which can reduce overhead of the MAC frame header, improve transmission efficiency, and complete transmission in presence of data frame forwarding. Furthermore, since all address fields are set by using an MAC address, lengths of the first 6 bytes in the address fields are unified and processing is thus facilitated.

As an alternative, as shown in FIG. 4 and Table 5, if the receiver of the data frame is an STA and the transmitter of the data frame is an STA, i.e. ToDS=0 and FromDS=0, it may be determined that the transmitter of the data frame is a source station of the frame and the receiver is a destination station of the frame, and consequently, the address field may be used for carrying only the SA of the data frame after which 000000 (6 bytes) is padded;

if the receiver of the data frame is an AP and the transmitter of the data frame is an STA, i.e. ToDS=1 and FromDS=0, the AP may need to forward the data frame, and consequently, the address field may be used for carrying only the SA (6 bytes) of the data frame and the DA (6 bytes) of the data frame; and if the receiver of the data frame is an STA and the transmitter of the data frame is an AP, i.e. ToDS=0 and FromDS=1, the data frame may be forwarded from the AP, and consequently, the address field may be used for carrying only the BSSID (6 bytes) of the BSS of the data frame and the SA (6 bytes) of the data frame.

TABLE 5

| ToDS | FromDS | Address Field | | Description |
|------|--------|--------------|--|-------------|
| 0 | 0 | TA = SA(6) | 000000 | Sending from STA to STA |
| 1 | 0 | TA = SA(6) | DA(6) | Sending from STA to AP |
| 0 | 1 | TA = BSSID(6) | SA(6) | Sending from AP to STA |

As a result, as shown in Table 6, in the case that the receiver of the data frame is an STA and the transmitter of the data frame is an STA, the MAC frame header has 20 bytes in total, and thus 8 bytes are reduced compared with the prior art;

in the case that the receiver of the data frame is an AP and the transmitter of the data frame is an STA, the MAC frame header has 20 bytes in total, and thus 8 bytes are reduced compared with the prior art; and in the case that the receiver of the data frame is an STA and the transmitter of the data frame is an AP, the MAC frame header has 20 bytes in total, and thus 8 bytes are reduced compared with the prior art.

TABLE 6

| ToDS | FromDS | Improved MAC Header | Bytes Reduced |
|------|--------|---------------------|---------------|
| 0 | 0 | 20 Bytes | 8 Bytes |
| 1 | 0 | 20 Bytes | 8 Bytes |
| 0 | 1 | 20 Bytes | 8 Bytes |

Consequently, the method for transmitting the data frame in the embodiment of the present invention enables that at most 12 bytes are included in the address field, which can reduce overhead of the MAC frame header, improve transmission efficiency, and complete transmission in presence of data frame forwarding. Furthermore, all of the address fields have a length of 12 bytes and processing is thus further facilitated.

The embodiment of the present invention further includes a step of: determining a frame check sequence (FCS) of the data frame according to a frame header, a frame body and a receiving address (RA) of the data frame.

In S140, the transmitter may send the data frame including the ToDS, the FromDS and the address field to the receiver; and optionally, the transmitter may send the data frame including the ToDS, the FromDS, the address field and the FCS to the receiver.

In the method for transmitting the data frame in the embodiment of the present invention, it is determined that the address field carries the DA and/or SA of the data frame via the data transmission direction information for determining a data frame transmission station, which can reduce overhead of the MAC frame header, improve transmission efficiency, and complete transmission in presence of data frame forwarding.

It should be understood that, term "and/or" in the present disclosure is merely an association relationship describing associated objects, and represents that three relations may exist, e.g. A and/or B may represent the following three situations: sole existence of A, concurrent existence of A and B, and sole existence of B. In addition, character "/" in the present disclosure generally represents that associated objects have a relationship of "or".

It should be understood that, in various embodiments of the present invention, values of sequence numbers of the above-mentioned various processes do not mean an order of execution which should be determined based upon functionalities and internal logics thereof, rather than setting any limitation to implementation of the embodiment of the present invention. For example, in an embodiment of the present invention, values of the ToDS and the FromDS may be determined at first, and the destination address (DA) and/or the source address (SA) may then be acquired; or, the destination address (DA) and/or the source address (SA) may be acquired at first, and the values of the ToDS and the FromDS are then determined; or, the destination address DA and/or the source address SA, as well as the values of the ToDS and the FromDS may be determined simultaneously. However, the embodiment of the present invention is not limited to the above-mentioned examples.

In the embodiment of the present invention, an AP may serve as a source station or a destination station of data, just like a non-AP STA, and may also serve as a forwarding node to forward a data frame sent by an STA to other station or device. Therefore, when an AP is a transmitter, it may be a source station or a forwarding station. When an AP is a receiver, it may be a destination station or a forwarding station. As a result, a forwarding bit may be added to a data frame to identify whether an AP is a source station, a destination station or a forwarding station. When the AP is a source station or a destination station, an address field may be further compressed, and a receiver may determine whether the AP is a source station, a destination station or a forwarding station according to the forwarding bit. As shown in FIG. 5, the step of sending the data frame including the ToDS, the FromDS and the address field to the receiver, further includes the following steps:

S141, determining a value of a forwarding identification bit (Forwarding) according to the data transmission direction information and to the DA or the SA; and S143, sending the data frame including the ToDS, the FromDS, the address field and the Forwarding to the receiver; and alternatively, sending the data frame including the ToDS, the FromDS, the address field, the FCS and the Forwarding to the receiver.

Specifically, in S141, the transmitter may determine the value of the Forwarding according to the data transmission direction information and the address acquired in S120. For example, if the receiver of the data frame is an AP and the transmitter of the data frame is an STA, i.e. ToDS=1 and FromDS=0, and the BSSID of the AP is the same as the DA of the data frame, then the Forwarding may be set to 0, representing that the AP is the destination station of the data frame and there is no need to forward the data frame;

if the receiver of the data frame is an AP and the transmitter of the data frame is an STA, i.e. ToDS=1 and FromDS=0, and the BSSID of the AP is different from the DA of the data frame, then the Forwarding may be set to 1, representing that the AP is not the destination station of the data frame and it is necessary to forward the data frame;

if the receiver of the data frame is an STA and the transmitter of the data frame is an AP, i.e. ToDS=0 and FromDS=1, and the BSSID of the AP is the same as the SA of the data frame, then the Forwarding may be set to 0, representing that the AP is the source station of the data frame and the data frame is not forwarded from the AP; and if the receiver of the data frame is an STA and the transmitter of the data frame is an AP, i.e. ToDS=0 and FromDS=1, and the BSSID of the AP is different from the SA of the data frame, then the Forwarding may be set to 1, representing that the AP is not the source station of the data frame and the data frame is forwarded from the AP.

It should be understood that, setting the Forwarding to the above specific values is merely one embodiment of the present invention, and all other values that enable the receiver to determine whether the AP is a source station, a destination station or a forwarding station shall fall into the protection scope of the present invention. For example, it is also possible to set the Forwarding to 0 for representing that the AP is not the source station or the destination station of the data frame, and set the Forwarding to 1 for representing that the AP is the source station or the destination station of the data frame.

In S141, the transmitter may add and set the Forwarding in an information field (PHY SIG) or a service field (Service field) or a Frame Control field (Frame Control Field) of a physical layer frame header of the data frame, and send the Forwarding to the receiver.

Figure 6:
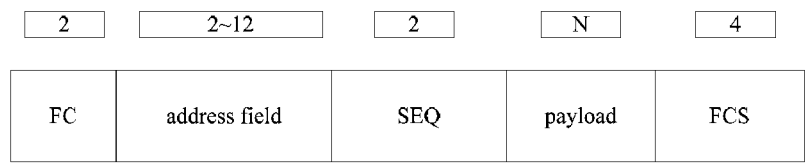
FIG. 6 is a schematic diagram of a structure of an MAC frame header generated by a method for transmitting a data frame according to another embodiment of the present invention.

When the AP is the source station or the destination station of the data frame, there is no forwarding situation regarding the data frame, and thus the address field may be further shortened. For example, As an alternative, as shown in FIG. 6 and Table 7, if the receiver of the data frame is an AP and the transmitter of the data frame is an STA, i.e. ToDS=1 and FromDS=0, and the AP is not the destination station of the data frame, i.e. Forwarding=1 (representing that it is necessary to forward the data frame by the AP), then the address field may be used for carrying only the SA of the data frame, and may be set to be the AID (2 bytes) of the transmitter in the BSS for data frame transmission and the DA (6 bytes) of the data frame;

if the receiver of the data frame is an STA and the transmitter of the data frame is an AP, i.e. ToDS=0 and FromDS=1, and the AP is not the source station of the data frame, i.e. Forwarding=1 (representing that the data frame is forwarded from the AP), then the address field may be used for carrying only the BSSID (6 bytes) of the AP and the SA (6 bytes) of the data frame;

if the receiver of the data frame is an AP and the transmitter of the data frame is an STA, i.e. ToDS=1 and FromDS=0, and the AP is the destination station of the data frame, i.e. Forwarding=0 (representing that it is not necessary to forward the data frame by the AP), then the address field may be used for carrying only the SA of the data frame, and may be set to be the AID (2 bytes) of the transmitter in the BSS for data frame transmission; and if the receiver of the data frame is an STA and the transmitter of the data frame is an AP, i.e. ToDS=0 and FromDS=1, and the AP is the source station of the data frame, i.e. Forwarding=0 (representing that the data frame is not forwarded from the AP), then the address field may be used for carrying only the SA of the data frame, and may be set to be the BSSID (6 bytes) of the AP. The BSSID in the embodiment of the present invention may also be replaced with any identifier that can stand for or represent the AP, such as an AID, a service set identifier (SSID) or a network identifier (Network ID) of the AP, etc.

TABLE 7

| Forwarding | ToDS | FromDS | Address Field | | Description |
|---|---|---|---|---|---|
| 1 | 1 | 0 | TA = AID(2) | DA(6) | Sending from STA to AP, and AP is not the destination station |
| | 0 | 1 | TA = BSSID(6) | SA(6) | Sending from AP to STA, and AP is not the source station |
| 0 | 1 | 0 | TA = AID(2) | Null(0) | Sending from STA to AP, and AP is the destination station |
| | 0 | 1 | TA = BSSID(6) | Null(0) | Sending from AP to STA, and AP is the source station |

As a result, as shown in Table 8, in the case that the receiver of the data frame is an AP, the transmitter of the data frame is an STA and the AP is not the destination station of the data frame, the MAC frame header has 16 bytes in total, and thus 12 bytes are reduced compared with the prior art;

in the case that the receiver of the data frame is an STA, the transmitter of the data frame is an AP and the AP is not the source station of the data frame, the MAC frame header has 20 bytes in total, and thus 8 bytes are reduced compared with the prior art;

in the case that the receiver of the data frame is an AP, the transmitter of the data frame is an STA and the AP is the destination station of the data frame, the MAC frame header has 10 bytes in total, and thus 18 bytes are reduced compared with the prior art; and in the case that the receiver of the data frame is an STA, the transmitter of the data frame is an AP and the AP is the source station of the data frame, the MAC frame header has 14 bytes in total, and thus 14 bytes are reduced compared with the prior art.

TABLE 8

| Forwarding | ToDS | FromDS | Improved MAC Header | Bytes Reduced |
|---|---|---|---|---|
| 1 | 1 | 0 | 16 Bytes | 12 Bytes |
| | 0 | 1 | 20 Bytes | 8 Bytes |
| 0 | 1 | 0 | 10 Bytes | 18 Bytes |
| | 0 | 1 | 14 Bytes | 14 Bytes |

The method for transmitting the data frame in the embodiment of the present invention enables that at most 12 bytes are included in the address field, which can reduce overhead of the MAC frame header, improve transmission efficiency, and complete transmission in the presence of data frame forwarding. Furthermore, a shortest address field only occupies 2 bytes, which may further reduce the overhead of the MAC frame header.

Figure 7:
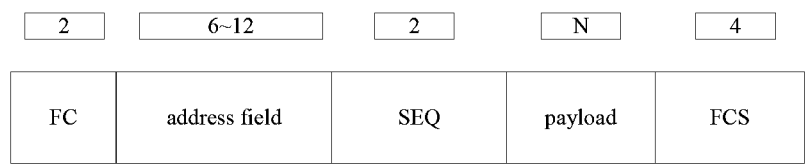
FIG. 7 is a schematic diagram of a structure of an exemplary MAC frame header generated by a transmitter according to another embodiment of the present invention.

Optionally, as shown in FIG. 7 and Table 9, if the receiver of the data frame is an AP and the transmitter of the data frame is an STA, i.e. ToDS=1 and FromDS=0, and the AP is not the destination station of the data frame, i.e. Forwarding=1 (representing that it is necessary to forward the data frame by the AP), then the address field may be used for carrying only the SA (6 bytes) of the data frame and the DA (6 bytes) of the data frame;

if the receiver of the data frame is an STA and the transmitter of the data frame is an AP, i.e. ToDS=0 and FromDS=1, and the AP is not the source station of the data frame, i.e. Forwarding=1 (representing that the data frame is forwarded from the AP), then the address field may be used for carrying only the BSSID (6 bytes) of the AP and the SA (6 bytes) of the data frame;

if the receiver of the data frame is an AP and the transmitter of the data frame is an STA, i.e. ToDS=1 and FromDS=0, and the AP is the destination station of the data frame, i.e. Forwarding=0 (representing that it is not necessary to forward the data frame by the AP), then the address field may be used for carrying only the SA (6 bytes) of the data frame; and if the receiver of the data frame is an STA and the transmitter of the data frame is an AP, i.e. ToDS=0 and FromDS=1, and the AP is the source station of the data frame, i.e. Forwarding=0 (representing that the data frame is not forwarded from the AP), then the address field may be used for carrying only the BSSID (6 bytes) of the AP.

TABLE 9

| Forwarding | ToDS | From0 DS | Address Field | | Description |
|---|---|---|---|---|---|
| 1 | 1 | 0 | TA = SA(6) | DA(6) | Sending from STA to AP, and AP is not the destination station |
| | 0 | 1 | TA = BSSID(6) | SA(6) | Sending from AP to STA, and AP is not the source station |
| 0 | 1 | 0 | TA = SA(6) | Null | Sending from STA to AP, and AP is the destination station |
| | 0 | 1 | TA = BSSID(6) | Null | Sending from AP to STA, and AP is the source station |

As a result, as shown in Table 10, in the case that the receiver is an AP, the transmitter is an STA and the AP is not the destination station of the data frame, the MAC frame header has 20 bytes in total, and thus 8 bytes are reduced compared with the prior art;

in the case that the receiver is an STA, the transmitter is an AP and the AP is not the source station of the data frame, the MAC frame header has 20 bytes in total, and thus 8 bytes are reduced compared with the prior art;

in the case that the receiver is an AP, the transmitter is an STA and the AP is the destination station of the data frame, the MAC frame header has 14 bytes in total, and thus 14 bytes are reduced compared with the prior art; and in the case that the receiver of the data frame is an STA, the transmitter of the data frame is an AP and the AP is the source station of the data frame, the MAC frame header has 14 bytes in total, and thus 14 bytes are reduced compared with the prior art.

TABLE 10

| Forwarding | ToDS | FromDS | Improved MAC Header | Bytes Reduced |
|---|---|---|---|---|
| 1 | 1 | 0 | 20 Bytes | 8 Bytes |
|  | 0 | 1 | 20 Bytes | 8 Bytes |
| 0 | 1 | 0 | 14 Bytes | 14 Bytes |
|  | 0 | 1 | 14 Bytes | 14 Bytes |

The method for transmitting the data frame in the embodiment of the present invention enables that at most 12 bytes are included in the address field, which can reduce overhead of the MAC frame header, improve transmission efficiency, and complete transmission in presence of data frame forwarding. Furthermore, as a setting is performed by employing an MAC address instead of an AID, a length of the first 6 bytes in the address field is unified and processing is thus facilitated.

Figure 8:
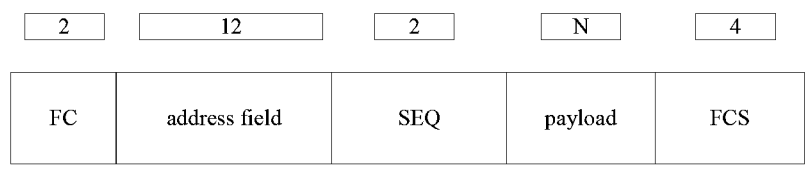
FIG. 8 is a schematic diagram of a structure of another exemplary MAC frame header generated by a transmitter according to another embodiment of the present invention.

Optionally, as shown in FIG. 8 and Table 11, if the receiver of the data frame is an AP and the transmitter of the data frame is an STA, i.e. ToDS=1 and FromDS=0, and the AP is not the destination station of the data frame, i.e. Forwarding=1 (representing that it is necessary to forward the data frame by the AP), then the address field may be used for carrying only the SA (6 bytes) of the data frame and the DA (6 bytes) of the data frame;

if the receiver of the data frame is an STA and the transmitter of the data frame is an AP, i.e. ToDS=0 and FromDS=1, and the AP is not the source station of the data frame, i.e. Forwarding=1 (representing that the data frame is forwarded from the AP), then the address field may be used for carrying only the BSSID (6 bytes) of the AP and the SA (6 bytes) of the data frame;

if the receiver of the data frame is an AP and the transmitter of the data frame is an STA, i.e. ToDS=1 and FromDS=0, and the AP is the destination station of the data frame, i.e. Forwarding=0 (representing that it is not necessary to forward the data frame by the AP), then the address field may be used for carrying only the SA (6 bytes) of the data frame and 000000 (6 bytes); and if the receiver of the data frame is an STA and the transmitter of the data frame is an AP, i.e. ToDS=0 and FromDS=1, and the AP is the source station of the data frame, i.e. Forwarding=0 (representing that the data frame is not forwarded from the AP), then the address field may be used for carrying only the BSSID (6 bytes) of the AP and 000000 (6 bytes).

TABLE 11

| Forwarding | ToDS | FromDS | Address Field | | Description |
|---|---|---|---|---|---|
| 1 | 1 | 0 | TA = SA(6) | DA(6) | Sending from STA to AP, and AP is not the destination station |
|  | 0 | 1 | TA = BSSID(6) | SA(6) | Sending from AP to STA, and AP is not the source station |
| 0 | 1 | 0 | TA = SA(6) | 000000 | Sending from STA to AP, and AP is the destination station |
|  | 0 | 1 | TA = BSSID(6) | 000000 | Sending from AP to STA, and AP is the source station |

As a result, as shown in Table 12, in the case that the receiver of the data frame is an AP, the transmitter of the data frame is an STA and the AP is not the destination station of the data frame, the MAC frame header has 20 bytes in total, and thus 8 bytes are reduced compared with the prior art;

in the case that the receiver of the data frame is an STA, the transmitter of the data frame is an AP and the AP is not the source station of the data frame, the MAC frame header has 20 bytes in total, and thus 8 bytes are reduced compared with the prior art;

in the case that the receiver is an AP, the transmitter is an STA and the AP is the destination station of the data frame, the MAC frame header has 20 bytes in total, and thus 8 bytes are reduced compared with the prior art; and in the case that the receiver of the data frame is an STA, the transmitter of the data frame is an AP and the AP is the source station of the data frame, the MAC frame header has 20 bytes in total, and thus 8 bytes are reduced compared with the prior art.

TABLE 12

| Forwarding | ToDS | FromDS | Improved MAC Header | Bytes Reduced |
|---|---|---|---|---|
| 1 | 1 | 0 | 20 Bytes | 8 Bytes |
|  | 0 | 1 | 20 Bytes | 8 Bytes |
| 0 | 1 | 0 | 20 Bytes | 8 Bytes |
|  | 0 | 1 | 20 Bytes | 8 Bytes |

Consequently, the method for transmitting the data frame in the embodiment of the present invention enables that at most 12 bytes are included in the address field, which can reduce overhead of the MAC frame header, improve transmission efficiency, and complete transmission in the presence of data frame forwarding. Furthermore, since all address fields have a length of 12 bytes, processing is further facilitated.

It should be understood that, various fields of the data frame that are generated by the method for transmitting the data frame according to the embodiment of the present invention, and numbers of bytes occupied by the fields and positions thereof in the MAC frame header, merely serve as one embodiment of the present invention, and the present invention is not limited to such embodiment. For example, a Duration/ID field may also be added as required.

In addition, during an implementation, a plurality of manners for setting the MAC frame header in the aforementioned embodiment may be employed, and may also co-exist with an existing method for setting an MAC frame header. A specific manner is to set an MAC frame header mode indication field in the information field (PHY SIG) or the service field (Service field) or the Frame Control field of the physical layer frame header of the data frame, and an MAC frame header indication manner used by a sending end is determined through different indication values. For instance, it is determined that an existing MAC frame header setting manner or a MAC frame header indication manner newly added in the aforementioned embodiment is used by a sending end. For example, 0 represents an existing indication manner, and 1 represents an indication manner in the embodiment of the present invention; or, 0 represents an existing indication way, 1 represents indication manner 1 in the embodiment of the present invention, and 2 represents a newly added indication manner 2, and so on.

Table 13 shows an existing manner for setting an MAC frame header, wherein all the address fields have a length of 6 bytes. In the existing indication manner, address 3 is set differently according to type of MAC layer data as a MAC service data unit (MSDU) or an aggregated-MAC service data unit (A-MSDU). As redundancy of the prior design, such a classification is unnecessary in a design of the embodiment of the present invention, and Table 13 may be referred to for a specific method.

TABLE 13

|  |  |  |  | Address 3 | | |
| --- | --- | --- | --- | --- | --- | --- |
| ToDS | FromDS | Address 1 | Address 2 | MSDU | A-MSDU | Description |
| 0 | 0 | RA = DA | TA = SA | BSSID | BSSID | Sending from STA to STA |
| 1 | 0 | RA = BSSID | TA = SA | DA | BSSID | Sending from STA to AP |
| 0 | 1 | RA = DA | TA = BSSID | SA | BSSID | Sending from AP to STA |

FIG. 9 illustrates a schematic flow of a method for transmitting a data frame 300 according to another embodiment of the present invention, which is illustrated in terms of a receiver. As shown in FIG. 9, the method 300 includes the following steps:

S210, receiving a data frame sent by a transmitter, wherein the data frame includes a to distributed system bit (ToDS), a from distributed system bit (FromDS), and an address field for carrying at least one address of a destination address (DA) and a source address (SA) of the data frame;

S220, determining, according to the ToDS and the FromDs, data transmission direction information for indicating a station for transmitting the data frame; and S230, determining, according to the data transmission direction information, address information carried by the address field to be at least one address of the DA and the SA.

In the embodiment of the present invention, the method for transmitting a data frame according to the embodiment of the present invention may optionally further include a step of: verifying that a frame check sequence (FCS) included in the data frame is correct according to a frame header, a frame body and a local media access control (MAC) address of the data frame. That is, when the FCS is verified to be correct, the aforementioned flows S220 and S230 are executed.

In the aforementioned embodiment, a scheme is introduced by taking a ToDS and a FromDS as an example, however, it is merely a specific method to employ the ToDS and the FromDS to indicate a data transmission direction, and any other indication manner from which a data transmission direction can be determined may be applied. For example, an uplink indication field and a downlink indication field are directly set, wherein uplink refers to sending from an STA to an AP, while downlink refers to sending from an AP to an STA, and so on.

As a result, it should be understood that, in the method of the embodiment of the present invention, data transmission direction information for indicating a data frame transmission station may be acquired at first, and then at least one address of a destination address (DA) and a source address (SA) that are corresponding to the data transmission direction information is determined. The method may be implemented with either ToDS and FromDS or other manner A method for transmitting a data frame in a new embodiment includes the following steps:

receiving a data frame sent by a transmitter, wherein the data frame includes data transmission direction information and an address field for carrying at least one address of a destination address (DA) and a source address (SA) of the data frame; and determining, according to the data transmission direction information, address information carried by the address field to be at least one address of the DA and the SA.

In S210, the receiver may receive the data frame sent by the transmitter, acquire values of the ToDS and the FromDS from the FC of the data frame, and read a bit value of the address field by starting from, for example, the third byte, of an MAC frame header, wherein the address field may occupies various different numbers of bytes according to a predetermined protocol, e.g. 2, 6, 8 or 12. It should be understood that, in the foregoing descriptions, the position of the address field and the number of bytes occupied by the address field in the MAC frame header merely constitutes one embodiment of the present invention, rather than limiting the present invention.

In S220, the receiver may determine the data transmission direction information according to the values of the ToDS and the FromDS, for example, if the value of the ToDS is 0 and the value of the FromDS is 0, then it may be determined that the receiver of the data frame is an STA and the transmitter of the data frame is an STA;

if the value of the ToDS is 1 and the value of the FromDS is 0, then it may be determined that the receiver of the data frame is an AP and the transmitter of the data frame is an STA; and if the value of the ToDS is 0 and the value of the FromDs is 1, then it may be determined that the receiver of the data frame is an STA and the transmitter of the data frame is an AP.

It should be understood that, the above determination of the data transmission direction information according to the values of the ToDS and the FromDS is merely one embodiment of the present invention, and any other value from which whether the transmitter and the receiver are an STA or an AP can be determined shall all fall into the protection scope of the present invention.

In S230, the receiver may determine, according to the data transmission direction information determined in S210, the address information carried by the address field to be the DA and/or the SA, for example, if ToDS=0 and FromDS=0, it may be determined that the receiver of the data frame is an STA and the transmitter of the data frame is an STA. In this case, the transmitter is a source station of the frame and the receiver is a destination station of the frame. Consequently, address information carried by the first two bytes in the address field may be determined to be an AID of the transmitter in a BSS for data frame transmission, and address information carried by the third to eighth bytes may be determined to be an BSSID of the BBS.

If ToDS=1 and FromDS=0, it may be determined that the receiver of the data frame is an AP and the transmitter of the data frame is an STA. In this case, it may be necessary to forward the data frame by the AP, and consequently, the address information carried by the first two bytes in the address field may be determined to be the AID of the transmitter in the BSS for data frame transmission, and the address information carried by the third to eighth bytes may be determined to be the DA of the data frame.

If ToDS=0 and FromDS=1, it may be determined that the receiver of the data frame is an STA and the transmitter of the data frame is an AP. In this case, the data frame may be forwarded by the AP, and consequently, the address information carried by the first two bytes in the address field may be determined to be an BSSID of the AP, and the address information carried by the third to eighth bytes may be determined to be the SA of the data frame.

As a result, in the case that the receiver of the data frame is an STA and the transmitter of the data frame is an STA, the MAC frame header has 16 bytes in total, and thus 12 bytes are reduced compared with the prior art;

in the case that the receiver of the data frame is an AP and the transmitter of the data frame is an STA, the MAC frame header has 16 bytes in total, and thus 12 bytes are reduced compared with the prior art; and in the case that the receiver of the data frame is an STA and the transmitter of the data frame is an AP, the MAC frame header has 20 bytes in total, and thus 8 bytes are reduced compared with the prior art;

The method for transmitting the data frame in the embodiment of the present invention enables that at most 12 bytes are included in the address field, which can reduce overhead of the MAC frame header, improve transmission efficiency, and complete transmission in the presence of data frame forwarding.

As an alternative, if ToDS=0 and FromDS=0, it may be determined that the receiver of the data frame is an STA and the transmitter of the data frame is an STA. In this case, the transmitter is the source station of the frame and the receiver is the destination station of the frame, and address information carried by the first six bytes in the address field may be determined to be the SA of the data frame.

If ToDS=1 and FromDS=0, it may be determined that the receiver of the data frame is an AP and the transmitter of the data frame is an STA. In this case, it may be necessary to forward the data frame by the AP. Therefore, address information carried by the first six bytes in the address field may be determined to be the SA of the data frame, and address information carried by the seventh to twelfth bytes may be determined to be the DA of the data frame.

If ToDS=0 and FromDS=1, it may be determined that the receiver of the data frame is an STA and the transmitter of the data frame is an AP. In this case, the data frame may be forwarded from the AP. Therefore, the address information carried by the first six bytes in the address field may be determined to be the BSSID of the AP, and the address information carried by the seventh to twelfth bytes may be determined to be the DA of the data frame.

Consequently, in the case that the receiver of the data frame is an STA and the transmitter of the data frame is an STA, the MAC frame header has 16 bytes in total, and thus 14 bytes are reduced compared with the prior art;

in the case that the receiver of the data frame is an AP and the transmitter of the data frame is an STA, the MAC frame header has 20 bytes in total, and thus 8 bytes are reduced compared with the prior art; and in the case that the receiver of the data frame is an STA and the transmitter of the data frame is an AP, the MAC frame header has 20 bytes in total, and thus 8 bytes are reduced compared with the prior art.

As a result, the method for transmitting the data frame in the embodiments of the present invention enables that at most 12 bytes are included in the address field, which can reduce overhead of the MAC frame header, improve transmission efficiency, and complete transmission in the presence of data frame forwarding. Furthermore, since all address fields are set by using an MAC address instead of an AID, lengths of the first 6 bytes in the address fields are unified and processing is thus facilitated.

In the embodiment of the present invention, in case that the AP executes functions of an AP and simultaneously acting as a terminal, the AP may become a source station or a destination station of a data frame. For example, a smart phone is set as a mobile AP. Hence, when the AP is a transmitter, it may be a source station or a forwarding station. When the AP is a receiver, it may be a destination station or a forwarding station. Consequently, a transmitter may add a forwarding bit to a data frame to identify whether the AP is a source station, a destination station or a forwarding station. When the AP is a source station or a destination station, the transmitter may further compress the address field, and the receiver may determine whether the AP is a source station, a destination station or a forwarding station according to the forwarding bit. As shown in FIG. 10, the step of determining, according to the data transmission direction information, address information carried by the address field to be the DA and/or SA, further includes the following steps:

S231, determining forwarding information according to a value of a forwarding identification bit (Forwarding) included in the data frame; and S233, determining, according to the data transmission direction information and the forwarding information, the address information carried by the address field to be the DA and/or the SA.

In S231, the receiver may determine the forwarding information according to the value of the Forwarding, for example, if Forwarding=0, it may be determined that the AP is the destination station or the source station of the data frame; and if Forwarding=1, it may be determined that the AP is not the destination station or the source station of the data frame.

It should be understood that, the above relationship between the value of the Forwarding and the forwarding information is merely one embodiment of the present invention, and any other value that can represent the relationship between the Forwarding and the forwarding information shall fall into the protection scope of the present invention. For example, if Forwarding=1, it may be determined that it is not necessary to forward the data frame by the AP or that the data frame is not forwarded from the AP; and if Forwarding=0, it may be determined that it is necessary to forward the data frame by the AP or that the data frame is forwarded from the AP.

Furthermore, in the embodiment of the present invention, the receiver may acquire the value of the Forwarding from an information field (PHY SIG) or a service field (Service field) or a Frame Control field of a physical layer frame header of the data frame.

In S233, the receiver may determine, according to the data transmission direction information and the forwarding information, the address information carried by the address field to be the DA and/or the SA. For example, if ToDS=1 and FromDS=0 (representing that the receiver of the data frame is an AP and the transmitter of the data frame is an STA), and the value of the Forwarding is 1 (representing that it is necessary to forward the data frame by the AP), then address information carried by the first two bytes of the address field may be determined to be an AID of the transmitter in a BSS for data frame transmission, and address information carried by the third to eighth bytes may be determined to be the DA (6 bytes) of the data frame;

if ToDS=0 and FromDS=1 (representing that the receiver of the data frame is an STA and the transmitter of the data frame is an AP), and the value of the Forwarding is 1 (representing that the data frame is forwarded from the AP), then address information carried by the first six bytes of the address field may be determined to be a BSSID (6 bytes) of the AP, and address information carried by the seventh to twelfth bytes may be determined to be the SA (6 bytes) of the data frame;

if ToDS=1 and FromDS=0 (representing that the receiver of the data frame is an AP and the transmitter of the data frame is an STA), and the value of the Forwarding is 0 (representing that it is not necessary to forward the data frame by the AP), then the address information carried by the first two bytes of the address field may be determined to be the AID of the transmitter in the BSS for data frame transmission; and if ToDS=0 and FromDS=1 (representing that the receiver of the data frame is an STA and the transmitter of the data frame is an AP), and the value of the Forwarding is 0 (representing that the data frame is not forwarded from the AP), then the address information carried by the first six bytes of the address field may be determined to be the BSSID (6 bytes) of the AP.

The method for transmitting the data frame in the embodiment of the present invention enables that at most 12 bytes are included in the address field, which can reduce overhead of the MAC frame header, improve transmission efficiency, and complete transmission in the presence of data frame forwarding. Furthermore, a shortest address field only occupies 2 bytes, which may further reduce the overhead of the MAC frame header.

As an alternative, if ToDS=1 and FromDS=0 (representing that the receiver of the data frame is an AP and the transmitter of the data frame is an STA), and the value of the Forwarding is 1 (representing that it is necessary to forward the data frame by the AP), then the address information carried by the first six bytes of the address field may be determined to be the SA of the data frame, and the address information carried by the sixth to twelfth bytes may be determined to be the DA (6 bytes) of the data frame;

if ToDS=0 and FromDS=1 (representing that the receiver of the data frame is an STA and the transmitter of the data frame is an AP), and the value of the Forwarding is 1 (representing that the data frame is forwarded from the AP), then the address information carried by the first six bytes of the address field may be determined to be the BSSID (6 bytes) of the AP, and the address information carried by the seventh to twelfth bytes may be determined to be the SA (6 bytes) of the data frame;

if ToDS=1 and FromDS=0 (representing that the receiver of the data frame is an AP and the transmitter of the data frame is an STA), and the value of the Forwarding is 0 (representing that it is not necessary to forward the data frame by the AP), then the address information carried by the first six bytes of the address field may be determined to be the SA of the data frame; and if ToDS=0 and FromDS=1 (representing that the receiver of the data frame is an STA and the transmitter of the data frame is an AP), and the value of the Forwarding is 0 (representing that the data frame is not forwarded from the AP), then the address information carried by the first six bytes of the address field may be determined to be the BSSID (6 bytes) of the AP.

The method for transmitting the data frame in the embodiment of the present invention enables that at most 12 bytes are included in the address field, which can reduce overhead of the MAC frame header, improve transmission efficiency, and complete transmission in presence of data frame forwarding. Furthermore, as a setting is performed by employing an MAC address instead of an AID, a length of the first 6 bytes in the address field is unified and processing is thus facilitated.

Furthermore, in the embodiment of the present invention, an address field may have a unified length of 12 bytes, which can reduce overhead of an MAC frame header, improve transmission efficiency, and complete transmission in presence of data frame forwarding. Further, since all of the address fields have a length of 12 bytes, processing is further facilitated.

The foregoing describes the method for transmitting the data frame according to the embodiment of the present invention in detail in conjunction with FIG. 1 to FIG. 10. An apparatus for transmitting a data frame according to an embodiment of the present invention will be described hereinafter in detail in conjunction with FIG. 11 and FIG. 12.

Figure 11:
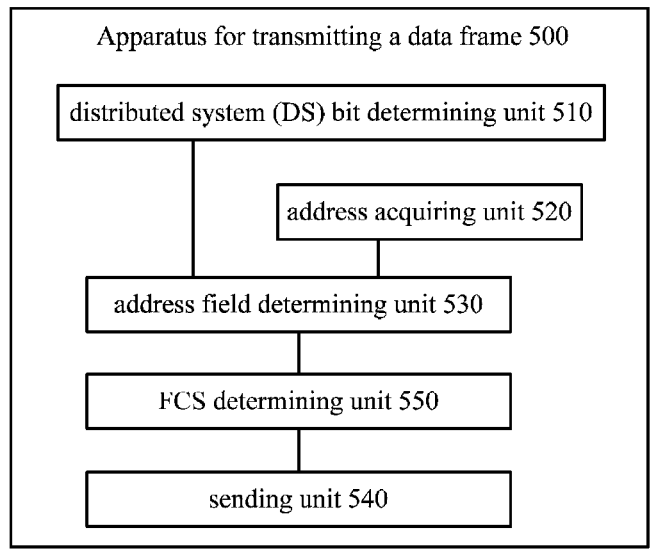
FIG. 11 is a schematic block diagram of an apparatus for transmitting a data frame according to an embodiment of the present invention.

FIG. 11 illustrates a schematic block diagram of an apparatus for transmitting a data frame 500 according to an embodiment of the present invention, which is illustrated in terms of a transmitter. As shown in FIG. 11, the apparatus 500 includes the following units:

a distributed system (DS) bit determining unit 510, configured to determine, according to data transmission direction information for indicating a station for transmitting a data frame, a value of a to distributed system bit (ToDS) and a value of a from distributed system bit (FromDS);

an address acquiring unit 520, configured to acquire at least one address of a destination address (DA) and a source address (SA) that are corresponding to the data transmission direction information;

an address field determining unit 530, configured to determine, according to the data transmission direction information, an address field for carrying at least one address of the DA and the SA acquired by the address acquiring unit; and a sending unit 540, configured to send the data frame including the ToDS, the FromDS and the address field to a receiver.

In the embodiment of the present invention, the address acquiring unit is optionally further configured to acquire a receiving address (RA); and accordingly, the apparatus further includes the following units:

an FCS determining unit 550, configured to determine a frame check sequence (FCS) of the data frame according to a frame header, a frame body and the receiving address (RA) of the data frame; and wherein the sending unit 540 is further configured to send the data frame including the ToDS, the FromDS, the address field and the FCS to the receiver.

Specifically, the address field determining unit 530 is further configured to:

determine, if the receiver of the data frame is an subscriber station (STA) and the transmitter of the data frame is an STA, that the address field carries the SA;

determine, if the receiver of the data frame is an access point (AP) and the transmitter of the data frame is an STA, that the address field carries an association identifier (AID) of the STA in a basic service set (BSS) of the AP and the DA, or that the address field carries the SA and the DA; and determine, if the receiver of the data frame is an STA and the transmitter of the data frame is an AP, that the address field carries a basic service set identifier (BSSID) of the AP and the SA.

The apparatus for transmitting the data frame in the embodiment of the present invention enables that at most 12 bytes are included in the address field, which can reduce overhead of the MAC frame header, improve transmission efficiency, and complete transmission in the presence of data frame forwarding.

In the embodiment of the present invention, the AP may serve as a source station or a destination station for data, just like a non-AP STA, and may also serve as a forwarding node to forward a data frame sent by an STA to other station or device. Therefore, when the AP is a transmitter, it may be a source station or a forwarding station. When the AP is a receiver, it may be a destination station or a forwarding station. As a result, a transmitter may add a forwarding bit to a data frame to identify whether an AP is a source station, a destination station or a forwarding station. When the AP is a source station or a destination station, the transmitter may further compress the address field, and a receiver may determine whether the AP is a source station, a destination station or a forwarding station according to the forwarding bit. Accordingly, the sending unit 540 is further configured to determine a value of a forwarding identification bit (Forwarding) according to the data transmission direction information and to the DA or the SA; and send the data frame including the ToDS, the FromDS, the address field, the FCS and the Forwarding to the receiver.

Specifically, the address field determining unit 530 is further configured to:

determine, if the receiver of the data frame is an AP, the transmitter of the data frame is an STA and a BSSID of the AP is different from the DA, that the address field carries an AID of the STA in a BSS of the AP and the DA, or that the address field carries the SA and the DA;

determine, if the receiver of the data frame is an STA, the transmitter of the data frame is an AP and a BSSID of the AP is different from the SA, that the address field carries the BSSID of the AP and the SA;

determine, if the receiver of the data frame is an AP, the transmitter of the data frame is an STA and a BSSID of the AP is the same as the DA, that the address field carries the DA; and determine, if the receiver of the data frame is an STA, the transmitter of the data frame is an AP and a BSSID of the AP is the same as the SA, that the address field carries the SA.

The apparatus for transmitting the data frame in the embodiment of the present invention enables that at most 12 bytes are included in the address field, which can reduce overhead of the MAC frame header, improve transmission efficiency, and complete transmission in the presence of data frame forwarding. Furthermore, a shortest address field only occupies 2 bytes, which may further reduce the overhead of the MAC frame header.

Additionally, in the embodiment of the present invention, the Forwarding may be carried in an information field (PHY SIG) or a service field (Service field) or a Frame Control field of a physical layer frame header of the data frame.

The apparatus for transmitting the data frame 500 according to the embodiment of the present invention may correspond to the transmitter in the method of the embodiment of the present invention. In addition, various units in the apparatus for transmitting the data frame 500 and other operation and/or functionality mentioned above are used for implementing corresponding flows of the method 100 in FIG. 1 and that of the method 200 in FIG. 5, respectively, and thus detailed description thereof is not set forth herein for simplicity.

Figure 12:
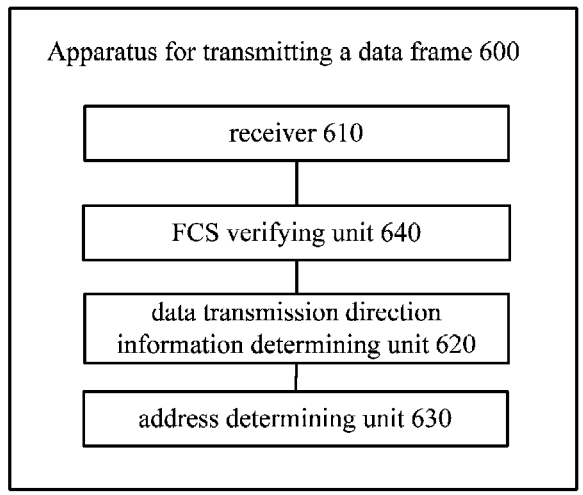
FIG. 12 is a schematic block diagram of an apparatus for transmitting a data frame according to another embodiment of the present invention.

FIG. 12 illustrates a schematic block diagram of an apparatus for transmitting a data frame 600 according to an embodiment of the present invention, which is illustrated in terms of the receiver. As shown in FIG. 2, the apparatus 600 includes the following units:

a receiver 610, configured to receive a data frame sent by a transmitter, wherein the data frame includes a to distributed system bit (ToDS), a from distributed system bit (FromDS), and an address field for carrying at least one address of a destination address (DA) and a source address (SA) of the data frame;

a data transmission direction information determining unit 620, configured to determine, according to the ToDS and the FromDs, data transmission direction information for indicating a station for transmitting the data frame; and an address determining unit 630, configured to determine, according to the data transmission direction information determined by the data transmission direction information determining unit 620, address information carried by the address field to be at least one address of the DA and the SA.

In the embodiment of the present invention, the apparatus 600 optionally further includes:

an FCS verifying unit 640, configured to verify that a frame check sequence (FCS) included in the data frame is correct according to a frame header, a frame body and a local media access control (MAC) address of the data frame.

Specifically, the address determining unit 630 is further configured to:

determine, if a receiver of the data frame is a subscriber station (STA) and the transmitter of the data frame is an STA, the address information carried by the address field to be the SA;

determine, if the receiver of the data frame is an access point (AP) and the transmitter of the data frame is an STA, the address information carried by the address field to be an association identifier (AID) of the STA in a basic service set (BSS) of the AP and the DA, or to be the SA and the DA; and determine, if the receiver of the data frame is an STA and the transmitter of the data frame is an AP, the address information carried by the address field to be a basic service set identifier (BSSID) of the AP and the SA.

The apparatus for transmitting the data frame in the embodiment of the present invention enables that at most 12 bytes are included in the address field, which can reduce overhead of the MAC frame header, improve transmission efficiency, and complete transmission in the presence of data frame forwarding.

In the embodiment of the present invention, the AP may serve as a source station or a destination station for data, just like a non-AP STA, and may also serve as a forwarding node to forward a data frame sent by an STA to other station or device. Therefore, when the AP is a transmitter, it may be a source station or a forwarding station. When the AP is a receiver, it may be a destination station or a forwarding station. As a result, a transmitter may add a forwarding bit to a data frame to identify whether an AP is a source station, a destination station or a forwarding station. When the AP is a source station or a destination station, the transmitter may further compress the address field, and a receiver may determine whether the AP is a source station, a destination station or a forwarding station according to the forwarding bit. Accordingly, the address determining unit 630 is further configured to: determine forwarding information according to a value of a forwarding identification bit (Forwarding) included in the data frame; and determine, according to the data transmission direction information and the forwarding information, the address information carried by the address field to be the DA and/or the SA.

Specifically, the address determining unit 630 is further configured to:

determine, if a receiver of the data frame is an AP, the transmitter of the data frame is an STA and it is necessary to forward the data frame by the AP, the address information carried by the address field to be an association identifier (AID) of the STA in a basic service set (BSS) of the AP and the DA, or to be the SA and the DA;

determine, if the receiver of the data frame is an STA, the transmitter of the data frame is an AP and the data frame is forwarded from the AP, the address information carried by the address field to be a basic service set identifier (BSSID) of the AP and the SA;

determine, if the receiver of the data frame is an AP, the transmitter of the data frame is an STA and it is not necessary to forward the data frame by the AP, the address information carried by the address field to be the DA; and determine, if the receiver of the data frame is an STA, the transmitter of the data frame is an AP and the data frame is not forwarded from the AP, the address information carried by the address field to be the SA.

The apparatus for transmitting the data frame in the embodiment of the present invention enables that at most 12 bytes are included in the address field, which can reduce overhead of the MAC frame header, improve transmission efficiency, and complete transmission in the presence of data frame forwarding. Furthermore, a shortest address field only occupies 2 bytes, which may further reduce the overhead of the MAC frame header.

In the embodiment of the present invention, the Forwarding may be carried in an information field (PHY SIG) or a service field (Service field) or a Frame Control field of a physical layer frame header of the data frame.

The apparatus for transmitting the data frame 600 according to the embodiment of the present invention may correspond to the receiver in the method of the embodiment of the present invention. In addition, various units in the apparatus for transmitting the data frame 600 and other operation and/or functionality mentioned above are for implementing corresponding flows of the method 300 in FIG. 9 and that of the method 400 in FIG. 10, respectively, and thus detailed description thereof is not set forth herein for simplicity.

A method flow and functionality described in an embodiment of a method can be implemented by an apparatus and a system in an embodiment of an apparatus. Further, in the aforementioned embodiment of a method, the scheme is introduced by taking a ToDS and a FromDS as an example, however, it is merely a specific method for indicating a data transmission direction to employ the ToDS and the FromDS, and it may be implemented by any other indication manner from which a data transmission direction can be determined. For example, an uplink indication field and a downlink indication field are directly set, wherein uplink refers to sending from an STA to an AP, while downlink refers to sending from an AP to an STA, and so on.

As a result, it should be understood that, in the method of the embodiment of the present invention, data transmission direction information for indicating a data frame transmission station may be acquired at first, and then at least one address of a destination address (DA) and a source address (SA), that are corresponding to the data transmission direction information, is determined. The method may be implemented by using either ToDS and FromDS or other manner.

An apparatus for transmitting a data frame in a new embodiment of the present invention includes the following units:

an address acquiring unit 520, configured to acquire at least one address of a destination address (DA) and a source address (SA) that are corresponding to data transmission direction information;

an address field determining unit 530, configured to determine, according to the data transmission direction information, an address field for carrying at least one address of the DA and the SA acquired by the address acquiring unit; and a sending unit 540, configured to send a data frame including the address field to a receiver.

In addition, the apparatus further includes:

a distributed system (DS) bit determining unit 510, configured to determine, according to the data transmission direction information for indicating a data frame transmission station, a value of a to distributed system bit (ToDS) and a value of the from distributed system bit (FromDS);

wherein the data frame sent to the receiver by the sending unit further includes the ToDS and the FromDS.

In the aforementioned embodiment, the distributed system (DS) bit determining unit is an optional unit.

An apparatus for transmitting a data frame in another embodiment includes the following units:

a receiver 610, configured to receive a data frame sent by a transmitter, wherein the data frame includes data transmission direction information and an address field for carrying at least one address of a destination address (DA) and a source address (SA) of the data frame; and an address determining unit 630, configured to determine, according to the data transmission direction information, address information carried by the address field to be at least one address of the DA and the SA.

In this case, the data frame includes a to distributed system bit (ToDS) and a from distributed system bit (FromDS), and the apparatus further includes:

a data transmission direction information determining unit 620, configured to determine data transmission direction information according to the ToDS and the FromDS, wherein the data transmission direction information is data transmission direction information for indicating a data frame transmission station.

Other embodiment mentioned above may be referred to for other necessary unit and module in the above-mentioned embodiment.

It should be understood that, in various embodiments of the present invention, values of sequence numbers of the above-mentioned various processes do not mean an order of execution which should be determined based upon functionalities and internal logics thereof, rather than setting any limitation to implementation of the embodiment of the present invention.

It should be appreciated by persons of ordinary skill in the art that, the units and algorithm steps of the respective examples described in conjunction with the embodiments disclosed in the present disclosure can be implemented with an electronic hardware, computer software or a combination thereof. In order to clearly illustrate interchangeability between hardware and software, compositions and steps of the respective examples have been generally described in the abovementioned description based upon functionalities. Whether these functionalities are executed in a manner of hardware or software depends on a specific application and a design constraint of the technical solution. For each specific application, different methods may be used by professionals to implement the described functionalities, but such implementation shall not be considered as beyond the scope of the present invention.

Steps of the methods or algorithms described in conjunction with the embodiments disclosed herein may be implemented with hardware, a software module executed by a processor, or a combination thereof. The software modules may resides in a random access memory (RAM), a memory, a read-only memory (ROM), an electrically programmable ROM, an electrically erasable programmable ROM, a register, a hard disk, a removable disk, a CD-ROM, or a storage media in any other form that is well-known in the technical field.

Though some embodiments of the present invention have been shown and set forth, it should be understood by those skilled in this art that various modifications can be made to these embodiments without departing from the principle and spirit of the present invention, and such modifications shall fall into the scope of the present invention.

What is claimed is:

1. A method for transmitting a data frame, comprising:
   acquiring, by a transmitter, at least one address of a destination address (DA) and a source address (SA) of the data frame;
   determining, by the transmitter according to data transmission direction information of the data frame and according to the at least one address of the DA and the SA of the data frame, a value of a forwarding identification bit (Forwarding bit), wherein the Forwarding bit is used for indicating whether the data frame needs to be forwarded by a receiver or indicating whether the data frame is forwarded from the transmitter; and
   sending, by the transmitter, the data frame to the receiver, wherein the data frame comprises a single address field, the data transmission direction information and the Forwarding bit, and
   when a value of the Forwarding bit indicates that the data frame does not need to be forwarded by the receiver or indicates that the data frame is not forwarded from the transmitter, the address field includes only a transmitter address (TA) field; and
   wherein if the transmitter of the data frame is a station (STA), the TA field is set to be an association identifier (AID) of the STA in a basic service set (BSS) of the data frame.

2. The method of claim 1, further comprising:
   determining, according to data transmission direction information, a value of a to distributed system bit (ToDS) and a value of a from distributed system bit (FromDS);
   wherein the data frame comprising the data transmission direction information comprises the ToDS and the FromDS.

3. The method of claim 1, further comprising:
   if the data transmission direction information indicates that the receiver of the data frame is an access point (AP) and the transmitter of the data frame is an STA, and if a basic service set identifier (BSSID) of the AP is different from the DA of the data frame, determining that the single address field includes only the TA field and a DA field; and
   if the data transmission direction information indicates that the receiver of the data frame is an STA and the transmitter of the data frame is an AP, and if a BSSID of the AP is different from the SA of the data frame, determining that the single address field includes only the TA field and an SA field.

4. A method for transmitting a data frame, comprising:
   receiving, by a receiver, a data frame sent by a transmitter, wherein the data frame comprises data transmission direction information, a single address field and a forwarding identification bit (Forwarding bit), wherein the Forwarding bit is used for indicating whether the data frame need to be forwarded by the receiver or indicating whether the data frame is forwarded from the transmitter;
   determining, by the receiver, forwarding information of the data frame according to a value of the Forwarding bit; and
   if the forwarding information of the data frame indicates that the data frame does not need to be forwarded by the receiver or the data frame is not forwarded from the transmitter, determining, by the receiver, that the single address field includes only a transmitter address (TA) field;
   wherein if the data transmission direction information indicates that the receiver of the data frame is an access point (AP) and the transmitter of the data frame is a station (STA), the TA field is set to be an association identifier (AID) of the STA in a basic service set (BSS) of the AP.

5. The method of claim 4, wherein the data frame comprising the data transmission direction information comprises a to distributed system bit (ToDS) and a from distributed system bit (FromDS).

6. The method of claim 4, wherein:
   if the data transmission direction information indicates that the receiver of the data frame is an AP and the transmitter of the data frame is an STA, and if the forwarding information of the data frame indicates that it is necessary to forward the data frame by the AP, determining that the single address field includes only the TA field and a destination address (DA) field; and
   if the data transmission direction information indicates that the receiver of the data frame is an STA and the transmitter of the data frame is an AP, and if the forwarding information of the data frame indicates that the data frame is forwarded from the AP, determining that the single address field includes only the TA field and a source address (SA) field.

7. An apparatus for transmitting a data frame, the apparatus comprising:
   an address acquiring unit, configured to acquire at least one address of a destination address (DA) and a source address (SA) of the data frame;
   an address field determining unit, configured to determine, according to data transmission direction information and according to at least one address of the DA and the SA of the data frame acquired by the address acquiring unit, a value of a forwarding identification bit (Forwarding bit), wherein the Forwarding bit is used for indicating whether the data frame need to be forwarded by a receiver or indicating whether the data frame is forwarded from a transmitter; and a sending unit, configured to send the data frame to the receiver, wherein the data frame comprises a single address field, the data transmission direction information and the Forwarding bit, and if a value of the Forwarding bit indicates that the data frame does not need to be forwarded by the receiver or indicates that the data frame is not forwarded from the transmitter, the address field includes only a transmitter address (TA) field; and wherein if the transmitter of the data frame is a station (STA), the TA field is set to be an association identifier (AID) of the STA in a basic service set (BSS) of the data frame.

8. The apparatus of claim 7, further comprising:

a distributed system (DS) bit determining unit, configured to determine, according to data transmission direction information, a value of a to distributed system bit (ToDS) and a value of a from distributed system bit (FromDS);

wherein the data frame comprising the data transmission direction comprises the ToDS and the FromDS.

9. The apparatus of claim 8, wherein the address field determining unit is further configured to:

if the data transmission direction information indicates that the receiver of the data frame is an AP and the transmitter of the data frame is an STA, and if a basic service set identifier (BSSID) of the AP is different from the DA of the data frame, determine that the single address field includes only the TA field and a DA field; and if the data transmission direction information indicates that the receiver of the data frame is an STA and the transmitter of the data frame is an AP, and if a BSSID of the AP is different from the SA of the data frame, determine that the single address field includes only the TA field and an SA field.

10. An apparatus for transmitting a data frame, the apparatus comprising:

a receiving unit, configured to receive a data frame sent by a transmitter, wherein the data frame comprises data transmission direction information, a single address field and a forwarding identification bit (Forwarding bit), wherein the Forwarding bit is used for indicating whether the data frame need to be forwarded by a receiver or indicating whether the data frame is forwarded from the transmitter; and an address determining unit, configured to determine forwarding information of the data frame according to a value of the Forwarding bit, and if the forwarding information of the data frame indicates that the data frame does not need to be forwarded by the receiver or the data frame is not forwarded from the transmitter, determine that the single address field includes only a transmitter address (TA) field;

wherein if the data transmission direction information indicates that the receiver of the data frame is an access point (AP) and the transmitter of the data frame is a station (STA), the TA field is set to be an association identifier (AID) of the STA in a basic service set (BSS) of the AP.

11. The apparatus of claim 10, wherein the data frame comprising the data transmission direction information comprises a distributed system bit (ToDS) and a distributed system bit (FromDS).

12. The apparatus of claim 10, wherein the address determining unit is further configured to:

if the data transmission direction information indicates that the receiver of the data frame is an AP and the transmitter of the data frame is an STA, and if the forwarding information of the data frame indicates that it is necessary to forward the data frame by the AP, determine that the single address field includes only the TA field and a destination address (DA) field; and if the data transmission direction information indicates that the receiver of the data frame is an STA and the transmitter of the data frame is an AP, and if the forwarding information of the data frame indicates that the data frame is forwarded from the AP, determine that the single address field includes only the TA field and a source address (SA) field.

* * * * *